United States Patent Office
3,341,405
Patented Sept. 12, 1967

3,341,405
METHOD OF CONTROLLING MICROBES BY MEANS OF TETRAHALOCYCLOPENTADI-ENYLDIAMINES
Edward D. Weil, Lewiston, N.Y., assignor to Hooker Chemical Corporation, Niagara Falls, N.Y., a corporation of New York
No Drawing. Continuation of application Ser. No. 414,898, Nov. 30, 1964. This application July 6, 1966, Ser. No. 563,300
9 Claims. (Cl. 167—30)

This application is a continuation of copending application Ser. No. 414,898, filed Nov. 30, 1964, now abandoned.

This invention comprises a new and useful method for the control of microbes, such as fungi and bacteria, and for the control of plant diseases caused by microbial pathogens, especially by fungal pathogens. More particularly, the invention comprises a method for the control of microbial pathogens and plant diseases caused by microbial pathogens by applying to the locus of said pathogens an effective quantity of a tetrahalocyclopentadiene derivative, which may be structurally represented as

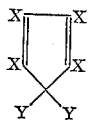

wherein X is an independently selected halogen, chlorine or bromine, and Y is a secondary amine moiety, also independently selected. Such compounds are described in U.S. Patent 3,136,764.

Y may be di-lower-alkylamino, preferably in which the alkyls are of 1 to 8, preferably 1 to 4 carbon atoms, diphenylamino, N-phenyl-lower alkylamino, N-morpholino, N-piperidino or N-pyrrolidino. A preferred compound is 5,5-dimorpholino-1,2,3,4-tetrachlorocyclopentadiene.

Plant diseases against which the method of the invention are effective include those caused by Pythium, Rhizoctonia, Fusarium, powdery mildew, and other fungi, also Pseudomonas, Xanthomonas, and other bacteria.

The method of the invention includes application of effective amounts of the stated chemicals to the foliage, root system (or medium in which the roots are growing) or to the seed. The mode of application will, of course, depend on the locus of the pathogens to be controlled.

Effective quantities range from about 0.05–200 pounds per acre, the lower amounts, such as 0.05–10 pounds/acre, being used when placement is exactly at the locus of the pathogens or a seedling to be protected so that material is not wasted in the areas between plants, for example, when the chemical is applied on or with seed during a planting operation. Higher rates, such as 10–200 pounds per acre are used when a body of soil is treated to a considerable depth. In foliar applications, quantities of 0.2–50 pounds per acre are most practicable. For foliar applications the chemical will usually be applied as an aqueous spray containing about 0.2–50 pounds compound per 100 gallons.

The method of the invention comprises applying any of the said chemicals, either in pure form (usually in a fine state of subdivision) or in a formulated form. The compounds may be dissolved in a solvent such as acetone, or more conveniently, may be formulated as a wettable powder or dust, employing in most cases a solid carrier or diluent such as clay, talc, calcium carbonate, or the like. Where a wettable powder is to be produced, one or more surface active agents are generally employed, such as dispersants of the lignosulfonate salt type and wetting agents of the alkylarylsulfonate type, to name a few. A further list of surfactants which may be employed is given by McCutcheon, "Detergents and Emulsifiers," Morristown, N.J., 1962.

The compositions used for the method of our invention may also incorporate other pesticides to achieve additive or in some cases, synergistic effects. For example, they may contain other fungicides such as sulfur, captan, organo-mercury compounds, dinitroalkylphenyl esters, fungicidal quinoxalines, copper salts, dithiocarbamate salts, nitropolychlorobenzenes, nitrotetrachloroanisole, 1,4-dimethoxydichlorobenzene and the like.

The compositions may also include insecticides and miticides such as DDT, lindane, chlordane, dieldrin, aldrin, endrin, insecticidal phosphates, insecticidal carbamates (such as carbaryl), bis(pentachlorocyclopentadienyl) endosulfan, and the like. A more complete list of suitable adjuvant insecticides is given by Kenaga, Bulletin of the Entomological Society of America, volume 9, No. 2 (June 1963).

*Example 1.—Wettable powder formulation*

The following are blended and ground in a hammer mill:

Parts by wt.
5,5-dimorpholino-1,2,3,4-tetrachlorocyclopentadiene _  10
Microcel E (synthetic silicate carrier) _____  24
Sorbit P (alkylarylsulfonate wetting agent) _____   2
Marasperse N (lignosulfonate dispersing agent) ____   4

*Example 2.—Foliar application*

Tomato plants are inoculated with spores of *Alternaria solani* (the causative fungus of early blight disease) shortly after spraying the plants with an aqueous 0.04% dispersion of 5,5-dimorpholino-1,2,3,4-tetrachlorocyclopentadiene. The plants are then incubated, along with similarly inoculated but unsprayed plants, in a moist chamber at 70 degrees Fahrenheit for 24 hours. The number of injured spots produced by early blight disease on the leaves of the sprayed plants was only 30% of the number of injured spots produced by the disease on the unsprayed plants.

Similar results are obtained using 5,5-piperidino-1,2,3,4-tetrachlorocyclopentadiene, 5,5 - bis(dimethylamino)-1,2, 3,4-tetrachlorocyclopentadiene, 5,5 - bis(diphenylamino)-1,2,3,4-tetrabromocyclopentadiene and 5,5 - pyrrolidino-1,2-dichloro-3,4-dibromocyclopentadiene.

*Example 3.—Soil application*

Soil heavily infested with Pythium, a damping-off fungus, was admixed with 50 parts per million of 5,5-dimorpholino-1,2,3,4-tetrachlorocyclopentadiene. After 3 days, the soil is planted with pea seeds. In the treated soil, 60% of the seeds germinated and yielded healthy seedlings, whereas in similarly infested untreated soil, all the plants failed to emerge because of damping off caused by the Pythium. In less heavily infested treated soil, 100% emergence of healthy seedlings occurs.

*Example 4.—Foliar application*

Bean plants inoculated with bean rust were sprayed with an aqueous 0.2% dispersion of 5,5-dimorpholino-1,2,3,4-tetrachlorocyclopentadiene. The sprayed plants showed only 37% infection after a period of incubation, as compared to 100% infection without the chemical treatment.

While various embodiments of the present invention have been described and illustrated in the preceding specification, the invention is not to be understood as limited thereto. It is to be recognized that changes and substitutions of equivalents may be made in the invention without departing therefrom or being outside the scope thereof. It is intended to cover the invention broadly in whatever form its principles may be utilized.

What is claimed is:

1. A method for controlling the growth of fungal and bacterial microbes which comprises applying to the locus of said microbe an effective growth-controlling amount of 5,5-diamino-1,2,3,4-tetrahalocyclopentadiene in which the tetrahalocyclopentadiene nucleus is bis-substituted in the 5-position by secondary amino groups selected from the group consisting of di-lower-alkylamino, diphenylamino, N-phenyl-lower-alkylamino, N-morpholino, N-piperidino and N-pyrrolidino.

2. A method according to claim 1 wherein the 5,5-diamino-1,2,3,4-tetrahalocyclopentadiene applied is 5,5-diamino-1,2,3,4-tetrachlorocyclopentadiene.

3. A method according to claim 2 wherein the 5,5-diamino-1,2,3,4-tetrachlorocyclopentadiene is applied to plant foliage.

4. A method according to claim 2 wherein the 5,5-diamino-1,2,3,4-tetrachlorocyclopentadiene is applied to soil.

5. A method according to claim 1 wherein the 5,5-diamino-1,2,3,4-tetrahalocyclopentadiene used is 5,5-dimorpholino-1,2,3,4-tetrachlorocyclopentadiene.

6. A method according to claim 2, for the control of fungi, wherein the 5,5-diamino-1,2,3,4-tetrachlorocyclopentadiene is applied to a locus of fungi.

7. A method according to claim 2, for the control of bacteria, wherein the 5,5-diamino-1,2,3,4-tetrachlorocyclopentadiene is applied to a locus of bacteria.

8. A method according to claim 6, for the control of fungi, wherein the fungi are contacted with the 5,5-diamino-1,2,3,4-tetrachlorocyclopentadiene.

9. A method according to claim 7, for the control of bacteria, wherein the bacteria are contacted with the 5,5-diamino-1,2,3,4-tetrachlorocyclopentadiene.

References Cited
UNITED STATES PATENTS 3,136,764  6/1964  McBee _____ 260—247.5

LEWIS GOTTS, *Primary Examiner.*

JULIAN S. LEVITT, *Examiner.*

N. G. MANN, S. K. ROSE, *Assistant Examiners.*